United States Patent
Clark et al.

(10) Patent No.: US 11,643,948 B2
(45) Date of Patent: May 9, 2023

(54) INTERNAL COOLING CIRCUITS FOR CMC AND METHOD OF MANUFACTURE

(71) Applicant: United Technologies Corporation, Farmington, CT (US)

(72) Inventors: Thomas E. Clark, Sanford, ME (US); Kathryn S. Read, Marlborough, CT (US); Winston Gregory Smiddy, Saco, ME (US); Andrew J. Lazur, Laguna Beach, CA (US)

(73) Assignee: Raytheon Technologies Corporation, Farmington, CT (US)

( * ) Notice: Subject to any disclaimer, the term of this patent is extended or adjusted under 35 U.S.C. 154(b) by 457 days.

(21) Appl. No.: 16/785,132

(22) Filed: Feb. 7, 2020

(65) Prior Publication Data
US 2020/0255345 A1    Aug. 13, 2020

Related U.S. Application Data

(60) Provisional application No. 62/803,255, filed on Feb. 8, 2019.

(51) Int. Cl.
*F01D 25/12* (2006.01)
*F01D 5/18* (2006.01)
*F01D 5/28* (2006.01)

(52) U.S. Cl.
CPC ............. *F01D 25/12* (2013.01); *F01D 5/187* (2013.01); *F01D 5/282* (2013.01); *F01D 5/284* (2013.01); *C04B 2235/5208* (2013.01); *F05D 2220/32* (2013.01); *F05D 2260/20* (2013.01); *F05D 2300/22* (2013.01); *F05D 2300/6033* (2013.01)

(58) Field of Classification Search
CPC .......... F01D 25/12; F01D 5/187; F01D 5/282; F01D 5/284; F05D 2220/32; F05D 2260/20; F05D 2300/22; F05D 2300/6033
See application file for complete search history.

(56) References Cited

U.S. PATENT DOCUMENTS

| | | | |
|---|---|---|---|
| 5,775,878 A * | 7/1998 | Maumus | F04D 29/284 416/223 R |
| 5,916,510 A | 6/1999 | Jessen | |
| 5,921,754 A | 7/1999 | Freitas et al. | |
| 6,627,019 B2 | 9/2003 | Jarmon et al. | |
| 6,746,755 B2 | 6/2004 | Morrison et al. | |

(Continued)

FOREIGN PATENT DOCUMENTS

EP    2134542 A2    12/2009

OTHER PUBLICATIONS

Extended European Search Report for EP Application No. 20156347.5, dated Sep. 17, 2020, 7 pages.

*Primary Examiner* — Courtney D Heinle
*Assistant Examiner* — Andrew Thanh Bui
(74) *Attorney, Agent, or Firm* — Kinney & Lange, P.A.

(57) ABSTRACT

A method for forming a ceramic matrix composite (CMC) component with an internal cooling channel includes partially densifying a first fiber preform to form a portion of a final ceramic matrix volume, machining a first channel into a surface of the partially densified first fiber preform, covering the first channel with a fibrous member to form a near net shape fiber preform with an internal passage formed by the first channel and the fibrous member, and densifying the near net shape fiber preform.

20 Claims, 4 Drawing Sheets

(56) References Cited

U.S. PATENT DOCUMENTS

| | | | |
|---|---|---|---|
| 7,665,962 B1* | 2/2010 | Liang | F01D 11/24 |
| | | | 415/173.1 |
| 8,202,588 B2 | 6/2012 | Keller et al. | |
| 8,257,809 B2 | 9/2012 | Morrison et al. | |
| 8,449,260 B2 | 5/2013 | Xie et al. | |
| 8,846,147 B2* | 9/2014 | Eberling-Fux | C04B 35/6286 |
| | | | 427/292 |
| 10,011,043 B2 | 7/2018 | Gray et al. | |
| 10,017,425 B2 | 7/2018 | Tuertscher et al. | |
| 10,954,809 B2* | 3/2021 | Sippel | C23C 16/045 |
| 10,995,039 B1* | 5/2021 | Dunn | C04B 38/04 |
| 2005/0077341 A1 | 4/2005 | Larrieu et al. | |
| 2013/0202420 A1* | 8/2013 | Floyd | F01D 25/14 |
| | | | 415/177 |
| 2016/0348586 A1 | 12/2016 | Uskert et al. | |
| 2016/0376921 A1 | 12/2016 | O'Leary et al. | |
| 2017/0101873 A1 | 4/2017 | Morgan et al. | |
| 2018/0223681 A1 | 8/2018 | Gallier et al. | |
| 2018/0272568 A1 | 9/2018 | Parolini et al. | |
| 2018/0328189 A1 | 11/2018 | Frey et al. | |
| 2018/0371930 A1* | 12/2018 | Sippel | F01D 25/246 |
| 2021/0292245 A1* | 9/2021 | Bouillon | C04B 35/58092 |

* cited by examiner

INTERNAL COOLING CIRCUITS FOR CMC AND METHOD OF MANUFACTURE

CROSS-REFERENCE TO RELATED APPLICATION(S)

This application claims the benefit of U.S. Provisional Application No. 62/803,255, filed Feb. 8, 2019, for "INTERNAL COOLING CIRCUITS FOR CMC AND METHOD OF MANUFACTURE" by T. Clark, K. Read, W. Smiddy, and A. Lazur.

BACKGROUND

The present disclosure relates generally to the manufacture of components for a gas turbine engine and more particularly to the manufacture of ceramic matrix composites (CMC) with integral cooling channels.

Lightweight CMC is a highly desirable material for gas turbine engine applications. CMCs exhibit excellent physical, chemical, and mechanical properties at high temperatures, making CMCs particularly desirable for producing hot section components. Cooling the components to maintain appropriate operating temperatures is critical to the performance, durability, and function of the component.

In conventional metal components, a core material is removed to provide cooling channels. Methods for providing integral complex cooling circuits in CMCs are needed.

SUMMARY

In one aspect, a method for forming a ceramic matrix composite (CMC) component with an internal cooling channel includes partially densifying a first fiber preform to form a portion of a final ceramic matrix volume, machining a first channel into a surface of the partially densified first fiber preform, covering the first channel with a fibrous member to form a near net shape fiber preform with an internal passage formed by the first channel and the fibrous member, and densifying the near net shape fiber preform to form the final ceramic matrix volume.

In another aspect, a method for forming a ceramic matrix composite (CMC) component with an internal cooling channel includes partially densifying first and second fiber preforms to form a portion of a final ceramic matrix volume, machining a first channel into a surface of the partially densified first fiber preform, covering the first channel with a fibrous member to form a near net shape fiber preform with an internal passage formed by the first channel and the fibrous member, and densifying the near net shape fiber preform to form the final ceramic matrix volume.

The present summary is provided only by way of example, and not limitation. Other aspects of the present disclosure will be appreciated in view of the entirety of the present disclosure, including the entire text, claims and accompanying figures.

While the above-identified figures set forth embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION

Cooling ceramic matrix composite (CMC) components to maintain appropriate operating temperatures is critical to the performance, durability, and function of the component. The present disclosure provides a method for manufacturing CMCs with complex internal cooling passages and cooling features. Channels are machined into a surface of a partially densified fiber preform and subsequently covered with another fibrous member to form a near net shape preform of the component with internal cooling defined by the fibrous member and channels. The resulting near net shape preform can be further densified while maintaining the internal cooling passages to form a component with internal cooling. Components formed using the disclosed method can include but are not limited to hot section components of a gas turbine engine, such as turbine blades, vanes, seals, and platforms, and combustor panels.

Figure 1:
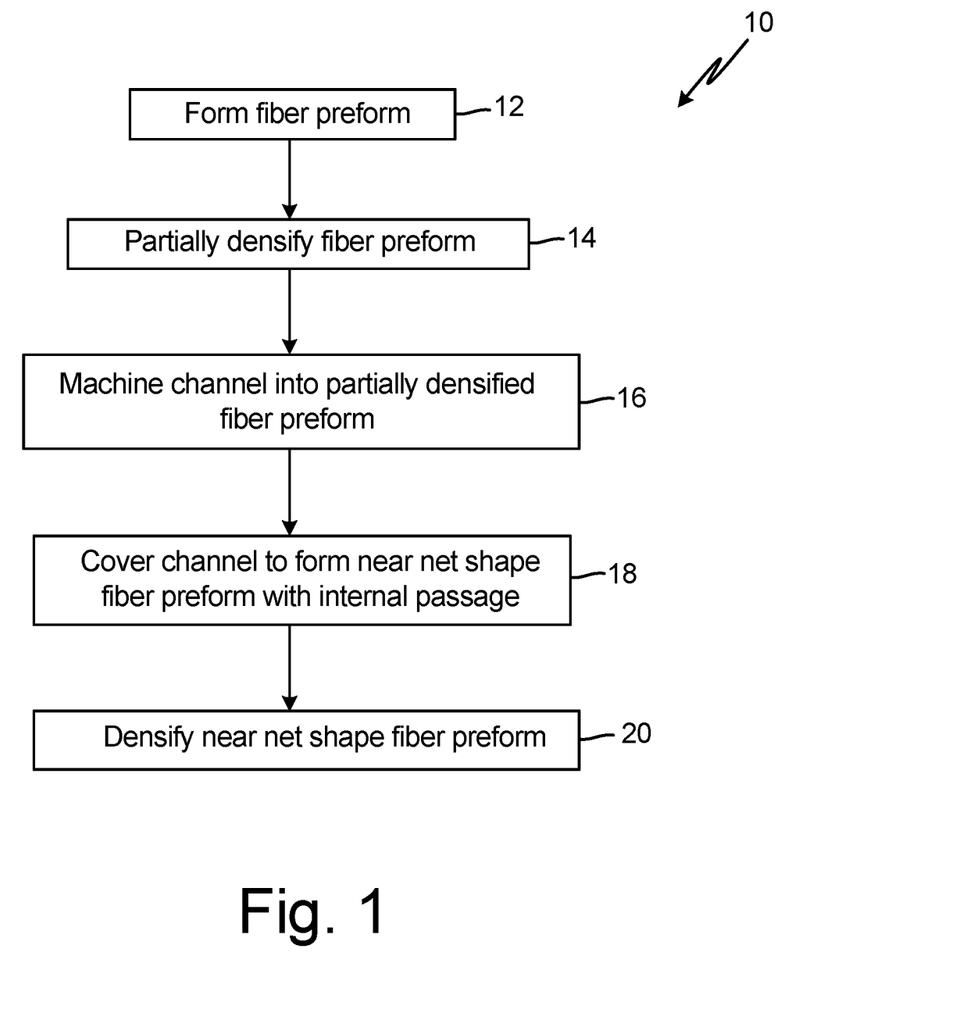
FIG. 1 is a flow chart of a method for forming a ceramic matrix composite component with an internal cooling channel.

FIG. 1 is a flow chart of method 10 for forming a CMC component with an internal cooling channel or circuit. Method 10 includes multiple embodiments, some of which are illustrated in FIGS. 2-5. First, a fiber preform of an internal section of the component is formed (step 12). Fiber preforms can be formed from a three-dimensional (3D) weave or a single or plurality of stacked two-dimensional (2D) woven fiber plies as known in the art. Suitable fiber materials include, but are not limited to, carbon, silicon carbide (SiC), alloyed and/or zirconium carbide, hafnium carbide, aluminum silicate, alumina, glass ceramic, and other materials suitable for high temperature operation. Interface coatings, such as boron nitride, can be applied to the fibers before or after a layup process to protect fibers from oxidation during component operation. Fibers can make up approximately 20 to 50 percent by volume of the portion of the component formed by the fiber preform, and preferably can make up 30 to 40 percent by volume.

The fiber preform is partially densified with a ceramic matrix material in step 14. Fiber preforms can be partially densified using chemical vapor infiltration (CVI), precursor infiltration and pyrolysis (PIP), slurry infiltration, melt infiltration (MI), and combinations thereof. Matrix materials can include, but are not limited to, SiC, alumina, boron carbide, and carbon. The matrix added in step 14 could result in near complete densification of the fiber preform. Preferably, a total volume fraction of fiber plus matrix can be approximately 50 to 70 percent following partial densification and, in some embodiments, up to 80 percent following partial densification. The amount of densification provided in this step can vary widely depending on a number of factors, including but not limited to a thickness and densification requirement of the fibrous member used to cover the cooling channels, layup of fiber preform (i.e., 3D woven preform or 2D layers), and machining capabilities.

These factors are interrelated and each factor should be considered in relation to the other factors. For example, machining can become more difficult as densification increases and, therefore, it can be desirable to limit partial densification of the fiber preform to an amount needed to provide a rigidity necessary for machining and maintaining machined features in a final densification step. However, if the fiber preform is formed from a plurality of fiber plies, additional densification may be required to provide the matrix material necessary to hold the plies together during machining. In some applications, use of a 3D dimensional woven fiber preform may be preferred over 2D to allow for reduced densification.

Final densification of the partially densified fiber preform occurs after the fibrous member has been positioned to cover or cap the cooling channels and, therefore, final densification of the partially densified fiber preform can require infiltration of the matrix material through the fibrous member. Fibrous members that are thick or pre-densified can impede or limit further densification of the underlying partially densified fiber preform as connected pores are filled. In such case, partially densified fiber preforms may need to be near full densification following the partial densification step. In contrast, fibrous members that are thin and/or are not partially densified can allow for additional densification of the underlying partially densified fiber preform. In this case, if the partially densified fiber preform is near full densification before the final densification step, additional matrix material may begin to undesirably fill the cooling channels. As such, a partially densified preform with a lower ceramic matrix volume may be preferred. Bonding between the fibrous member and the partially densified fiber preform can also be improved if the fibrous member and the partially densified fiber preform have a reduced level of densification in the region where the fibrous member and partially densified fiber preform are joined. The reduced level of densification at the interface can promote formation of a continuous matrix connecting the fibrous member and partially densified fiber preform in the final densification step and thereby improve bonding. It will be understood by one of ordinary skill in the art to provide matrix material in an amount that allows for machining of channels and heat transfer features that will retain their shape in a final densification step and to allow for full densification of the partially densified fiber preform after the fibrous member has been applied.

Figure 5:
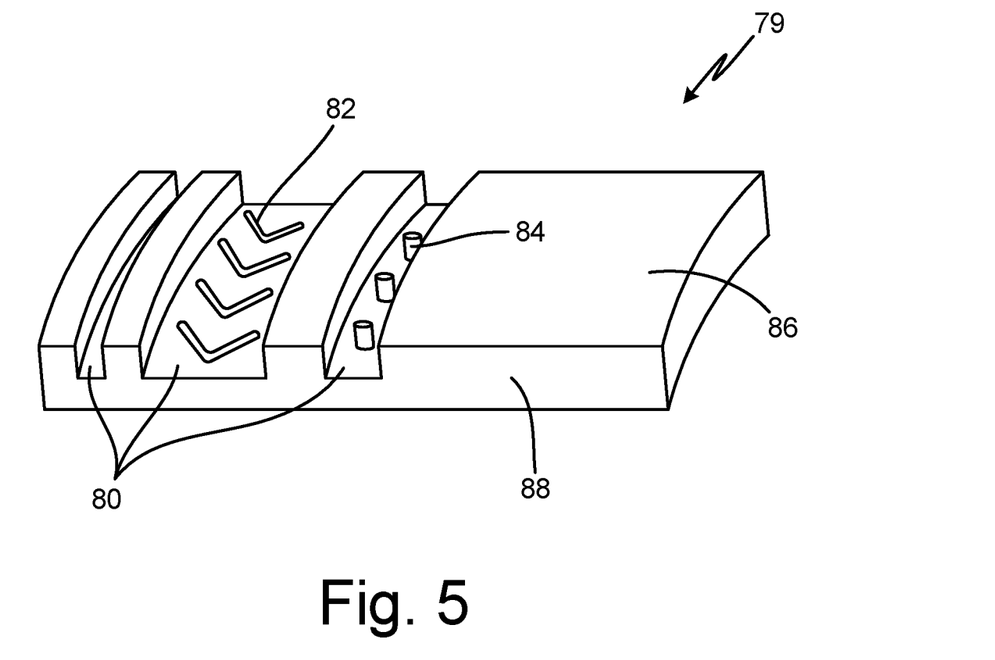
FIG. 5 is a perspective view of a partially densified fiber preform with cooling channels and heat transfer features.

Channels and heat transfer features can be machined into the partially densified fiber preform in step 16. FIG. 5 illustrates examples of channels and heat transfer features formed in a partially densified fiber preform. One or more channels can be provided in one or more surfaces of the partially densified fiber preform to form cooling passages or cooling circuits, which will form the internal cooling passages of the final component. Channels can be of any geometry, size, and connectivity based on the component cooling requirements. Heat transfer features, including trip strips, pins, and the like can also be provided in the cooling channels. Channels and heat transfer features can be provided using conventional machining methods, including but not limited to ultrasonic, laser, and electrical discharge machining. Complex geometries and cooling circuits can be formed by machining the surface of the partially densified fiber preform, and can be maintained in the final densification process without the use of a temporary mandrel. In the final densification process, a thin layer of matrix material can form on the surfaces of the channels and heat transfer features. Channels and protruding heat transfer features can be machined to accommodate the additional layer of matrix material (e.g., channels can be made larger and heat transfer features can be made smaller). Generally, the layer of matrix material formed in the channels in the final densification step will be less than 550 microns. Channel depth and width can be increased by the anticipated thickness of the subsequently deposited matrix material layer.

Figure 2:
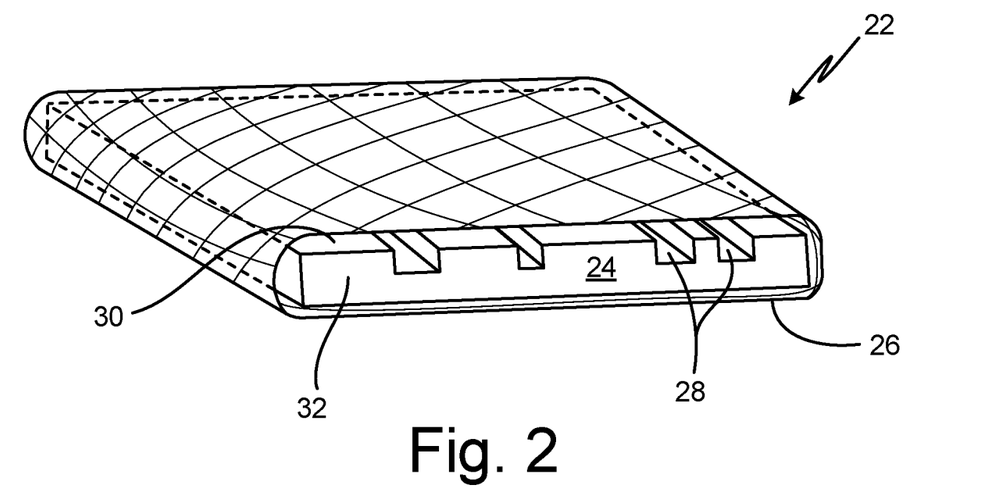
FIG. 2 is a perspective view of an overwrapped partially densified fiber preform with cooling channels.
Figure 3:
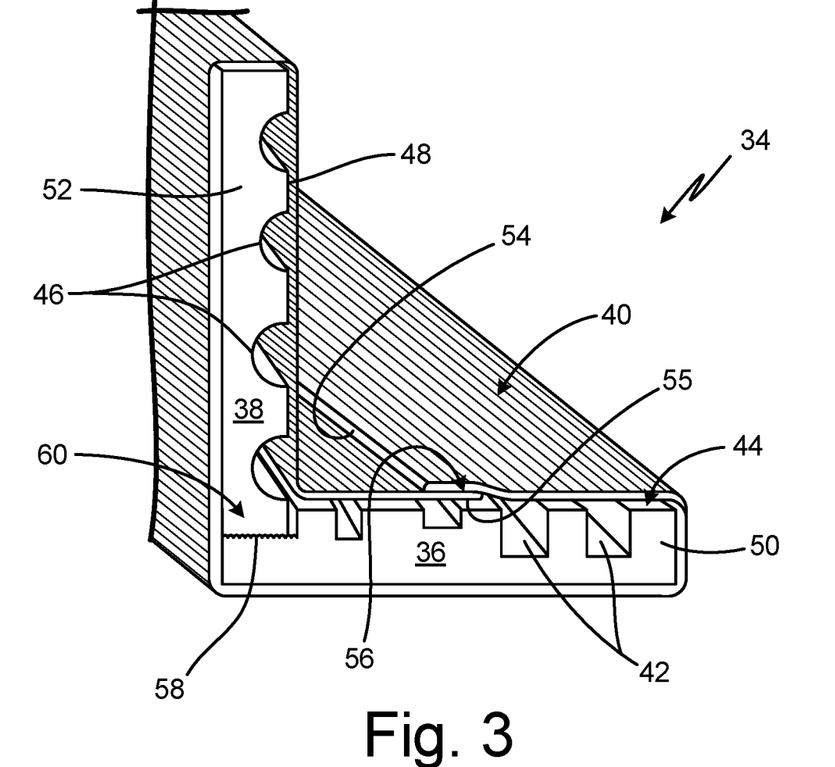
FIG. 3 is a perspective view of another embodiment of an overwrapped partially densified fiber preform with cooling channels.

Once the channels and heat transfer features are formed, they are covered or capped with another fibrous member in step 18 to form a near net shape preform with internal passages defined by the fibrous member and the channels. The fibrous member can be a densified fiber preform, overwrap material, including a woven fiber ply or braid, or combinations thereof, as illustrated in FIGS. 2-5. In one embodiment, the partially densified fiber preform can be inserted into a single braided fiber tube or a plurality of nested braided fiber tubes (FIG. 2). The braided fiber tube can be sized to substantially conform to an outer surface of the partially densified fiber preform such that the braided fiber tube is in tension across the channels thereby maintaining the channel passages between the partially densified fiber preform and the braided fiber tube. Braided fiber tubes can provide simple coverage with relatively good conformance over bend radii. In another embodiment, the partially densified fiber preform can be tightly wrapped in a woven fiber ply with ends of the fiber ply secured at an overlap joint with a preceramic polymer or other suitable permanent or temporary adhesive material or mechanical locking mechanism capable of maintaining tension in the fiber ply (FIG. 3). Similar to the braided fiber tube, the tension of the ply can be set to maintain passages defined by the fiber ply and channels of the partially densified preform. A single fiber ply can be wrapped multiple times around the partially densified fiber preform or multiple plies can be used to increase a thickness of the overwrap. Use of wrapped fiber plies may provide a cost benefit over braided fiber tubes, which can increase manufacturing complexity. Both woven fiber plies and fiber braids can be composed of fibers of the same material as the fibers of the preform.

Figure 4:
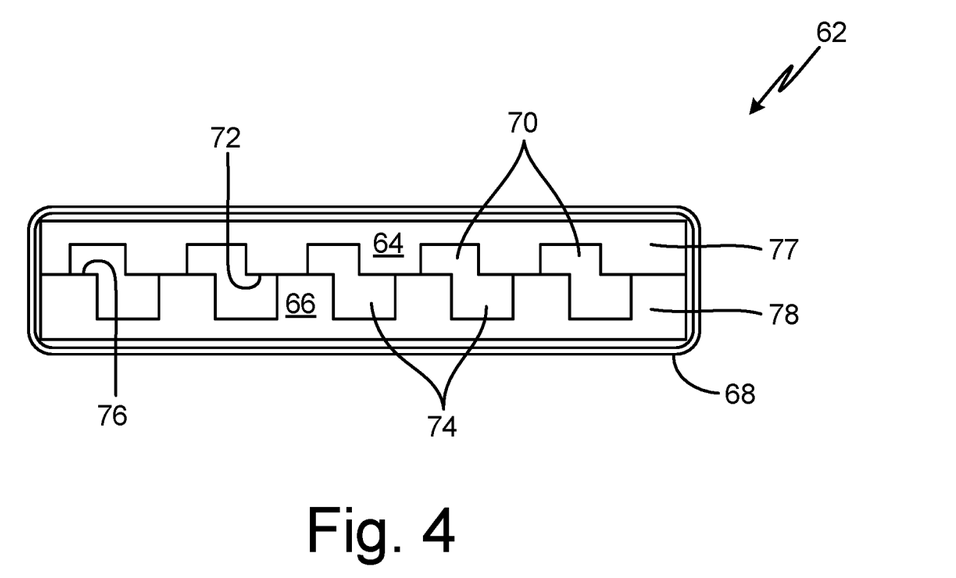
FIG. 4 is a cross-sectional view of yet another embodiment of an overwrapped partially densified fiber preform with machined cooling channels.

In yet another embodiment, a second partially densified fiber preform can be used to cover the channels of the first partially densified fiber preform (FIG. 4). The second partially densified fiber preform can be formed as previously described in steps 12 and 14. The second partially densified fiber preform can have a substantially flat surface positioned to adjoin the surface of the first partially densified first fiber preform. In some embodiments, the second partially densified fiber preform can also have channels and/or heat transfer features formed via machining as taught in step 16. The channels can be positioned to be in fluid communication with channels of the first partially densified fiber preform or can be offset from the channels of the first partially densified fiber preform. Alternatively, the channels of the second partially densified fiber preform can be located on a surface opposite the surface adjoining the first partially densified fiber preform. Both first and second partially densified fiber preforms can be wrapped by one or more woven fiber plies or can be inserted into one or more fiber braids of the same material.

In some embodiments, an overwrap material can be used to cover channels of multiple adjoining partially densified fiber preforms. The partially densified fiber preforms can be joined in any of a variety of configurations that allows the channels to remain uncovered until the overwrap is applied. Partially densified fiber preforms can be held in place by the overwrap with or without a temporary or permanent adhesive or joined with a preceramic polymer. In some embodiments, adjoining surfaces can be roughened to promote adhesion, or grooves can be machined in one surface to match an angle of the fiber in the adjoining surface such that the fibers can nest in the grooves creating a mechanical lock.

The thickness or number of layers of the overwrap material in any of the embodiments disclosed can vary depending on the desired location of the cooling passages in the final component relative to surface of the component. Overlap material can be provided in a manner that allows ends of the partially densified fiber preform to remain uncovered. For example, overlap material can cover four sides of a generally rectangular box-shaped partially densified fiber preform, leaving two ends uncovered. Alternatively, overlap material can be arranged and secured to cover all surfaces of the partially densified fiber preform. An interface coating such as boron nitride, can be applied to the fibers of the overwrap material to protect fibers from oxidation during component operation. Interface coatings can be provided before or after the overwrap material is applied to the partially densified fiber preform. It may be preferable to pre-apply the interface coating to the fiber overwrap material to prevent an additional layer of interface coating from forming on the partially densified fiber preform.

The resulting near net shape fiber preform is densified with a ceramic matrix in step 20. Final densification can be conducted using CVI using the same material used in the densification of the fiber preform. PIP, MI, slurry infiltration, or combinations thereof, can also be used for final densification with care taken to avoid filling the cooling channels. Matrix material can densify the fiber overwrap, densify the partially densified fiber preform, fill gaps between partially densified fiber preforms, and fill gaps between the partially densified preform and the overwrap, while maintaining the internal passages formed by the channels and any heat transfer features provided. The final component can have 20 to 50 percent fiber material by volume with a balance (up to 100 percent) of ceramic matrix by volume. It will be understood by one of ordinary skill in the art that some amount of porosity can remain following the final densification step and that complete densification may not be obtained.

Apertures connecting the cooling channels to a source of cooling fluid and film cooling holes connecting the cooling channels to an outer surface of the component can be formed through the densified component using conventional machining techniques including but not limited to ultrasonic machining and laser drilling. Additional manufacturing steps, including but not limited to finishing machining, heat treatment, application of environmental or thermal barrier coatings, can be conducted to provide a final densified component.

FIGS. 2-4 illustrate alternative embodiments of an overwrapped partially densified fiber preform with cooling channels formed using steps 12-18 of method 10 (FIG. 1). FIG. 2 provides a perspective view of near net shape preform 22 with partially densified preform 24 and fiber overwrap 26. As previously discussed, partially densified fiber preform 22 can be formed from a plurality of 2D fiber plies or a 3D weave. Partially densified fiber preform 24 includes a plurality of cooling channels 28 formed in an outer surface 30 via machining following partial densification. One or more channels 28 can open to an end 32 of partially densified fiber preform 24, or can be confined to an inner portion such that end 32 is closed. Fiber overwrap 26 consists of an undensified braided fiber tube in which partially densified preform 24 has been inserted. Braided fiber tube 26 can be sized to substantially conform to outer surface 30 of partially densified fiber preform 24 such that braided fiber tube 26 is in tension across channels 28 thereby forming internal passages defined by braided fiber tube 26 and channels 28. FIG. 2 illustrates a single overwrap braid, however, it will be understood that nested fiber braids can also be used to increase the thickness of the overwrap.

FIG. 3 provides a perspective view of near net shape preform 34 with adjoining partially densified preforms 36, 38 and fiber overwrap 40. Partially densified fiber preforms 36, 38 can be formed from a plurality of 2D fiber plies or a 3D weave. Partially densified fiber preform 36 includes a plurality of rectangular channels 42 formed in an outer surface 44 via machining following partial densification. Partially densified fiber preform 38 includes a plurality of rounded channels 46 formed in an outer surface 48 via machining following partial densification. One or more channels 42 and 46 can open to ends 50 and 52, respectively, or can be confined to an inner portion of partially densified fiber preforms 36, 38, such that ends 50, 52 are closed. Fiber overwrap 40 consists of an undensified woven fiber ply, which is closely wrapped around partially densified fiber preforms 36, 38 to substantially conform to outer surfaces 44, 48, such that overwrap 40 is in tension across channels 42, 46 thereby forming internal passages defined by overwrap 40 and channels 42, 46. Edges 54, 55 of overwrap 40 can be joined to a surface of overwrap 40 by a preceramic polymer or other temporary or permanent adhesive at an overlap joint 56 to maintain tension across channels 42, 46. FIG. 3 illustrates a single layer of woven fiber ply 40, however, it will be understood that a single woven fiber ply 40 can be can be wrapped around partially densified fiber preforms 36, 38 multiple times or multiple woven fiber plies can be used to increase the thickness of the overwrap. In some embodiments, overwrap 40 can hold partially densified fiber preforms 36, 38 in position. In other embodiments, grooves 58 can be machined into an outer surface of one of the partially densified fiber preforms 36, 38. Grooves 58 can match an orientation of fibers in the adjoining preform such that fibers can nest in grooves 58, creating a mechanical lock at joint 60.

FIG. 4 provides a cross-sectional view of near net shape preform 62 with adjoining partially densified preforms 64, 66 and fiber overwrap 68. Partially densified fiber preforms 64, 66 can be formed from a plurality of 2D fiber plies or a 3D weave. Partially densified fiber preform 64 includes a plurality of channels 70 formed in an outer surface 72 via machining following partial densification. Partially densified fiber preform 66 includes a plurality of channels 74 formed in an outer surface 76 via machining following partial densification. Partially densified fiber preforms 64, 66 are oriented in a stacked formation with channels 70, 74 facing each other and portions of surfaces 72, 76 adjoining one another. As illustrated in FIG. 4, channels 70 and 74 are in fluid communication, but positioned offset from one another. In alternative embodiments, channels 70 and 74 can be aligned or can be completely offset such that channels 70 and 74 are not in fluid communication. One or more channels 70 and 74 can open to ends 77 and 78, respectively, or can or can be confined to an inner portion of partially densified fiber preforms 64, 66, such that ends 77, 78 are closed. Fiber overwrap 68 consists of an undensified braided fiber tube in which partially densified preforms 64, 66 have been inserted. Braided fiber tube 68 can be sized to substantially conform to outer surface of partially densified fiber preforms 64, 66 to hold preforms 64, 66 together and limit gaps between overwrap 68 and preforms 64, 66. FIG. 4 illustrates a single overwrap braid, however, it will be understood that nested fiber braids can also be used to increase the thickness of the overwrap.

FIG. 5 is a perspective view of partially densified fiber preform 79 with cooling channels 80 and heat transfer features 82, 84. Partially densified fiber preform 79 can be formed from a plurality of 2D fiber plies or a 3D weave. Partially densified fiber preform 79 includes a plurality of cooling channels 80 formed in an outer surface 86 via machining following partial densification. One or more channels 80 can open to an end 88 of partially densified fiber preform 79, or can be confined to an inner portion such that end 88 is closed. One or more cooling channels 80 can be machined in a manner to provide projecting heat transfer features 82, 84. Heat transfer features 82, 84 can have any of a variety of geometries and orientations to provide heat transfer, not limited to those illustrated in FIG. 5. As illustrated, heat transfer features 82 are chevron-shaped trip strips, while heat transfer features 84 are cylindrical pins. Both heat transfer features 82, 84 protrude into cooling channels 80.

Figure 6A:
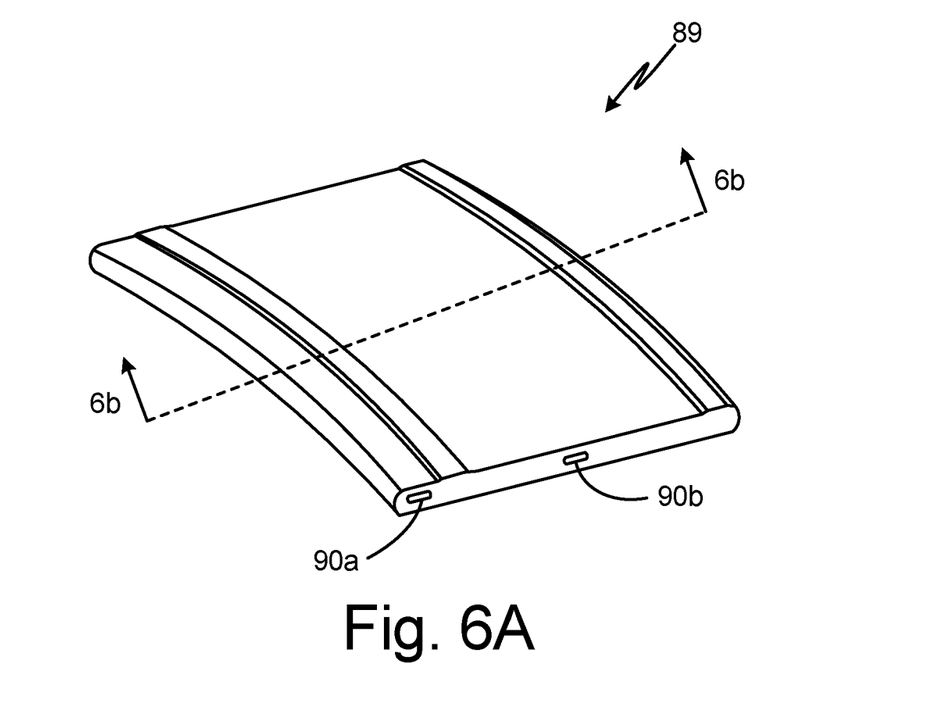
FIGS. 6A-6B are perspective views of a component formed using the method of FIG. 1.
Figure 6B:
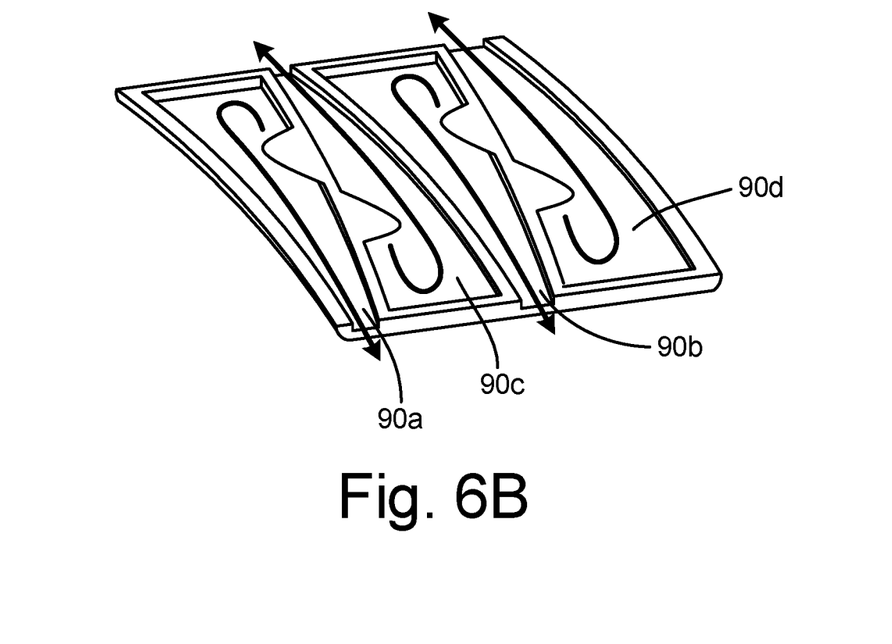

FIGS. 6A-6C illustrate a component formed using disclosed method 10 (FIG. 1). FIG. 6A shows component 89 formed from a partially densified fiber preform and overwrap. Component 89 has internal cooling channels 90*a* and 90*b* open to an outer end surface. FIG. 6B illustrates component 89 with a top surface removed to show internal cooling channels 90*a*-90*d*. Internal cooling channels 90*a*-90*d* have tapered cross-sections that alternate in orientation. Each channel 90*a*-90*d* opens to an end side of the component with channels 90*a* and 90*b* opening to one end and channels 90*c* and 90*d* opening to an opposite end.

Discussion of Possible Embodiments

The following are non-exclusive descriptions of possible embodiments of the present invention.

A method according to an exemplary embodiment of this disclosure, among other possible things, includes forming a ceramic matrix composite (CMC) component with an internal cooling channel includes partially densifying a first fiber preform to form a portion of a final ceramic matrix volume, machining a first channel into a surface of the partially densified first fiber preform, covering the first channel with a fibrous member to form a near net shape fiber preform with an internal passage formed by the first channel and the fibrous member, and densifying the near net shape fiber preform to form the final ceramic matrix volume.

The method of the preceding paragraph can optionally include, additionally and/or alternatively, any one or more of the following features, configurations, additional components, and/or steps:

A further embodiment of the foregoing method, wherein the fibrous member can be a braided fiber tube and wherein covering the first channel with the fibrous member can comprise inserting the partially densified first fiber preform into the braided fiber tube.

A further embodiment of any of the foregoing methods, wherein the fibrous member can be a fiber ply and wherein covering the first channel with the fibrous member comprises wrapping the fiber ply around the partially densified first fiber preform and joining an ends of the fiber ply at an overlap joint.

A further embodiment of any of the foregoing methods, wherein the fibrous member can be a partially densified second fiber preform.

A further embodiment of any of the foregoing methods, wherein the partially densified second fiber preform can have a surface with a second channel.

A further embodiment of any of the foregoing methods, wherein the first channel can open to the second channel.

A further embodiment of any of the foregoing methods, wherein machining the first channel can include forming heat transfer features on a channel surface.

A further embodiment of any of the foregoing methods can further include applying an interface coating to the first fiber preform before partially densifying the first fiber preform and applying an interface coating to the fibrous member before densifying the near net shape preform.

A further embodiment of any of the foregoing methods, wherein the first fiber preform can be a three-dimensional woven fiber preform.

A further embodiment of any of the foregoing methods, wherein partially densifying the first fiber preform can include forming a partially densified fiber preform having a total volume fraction of fiber plus ceramic matrix ranging from 50 to 70 percent.

A further embodiment of any of the foregoing methods, wherein an amount of densification provided in partially densifying the first fiber preform can be positively correlated with a thickness of the fibrous member covering the first channel, with densification increasing with thickness.

A further embodiment of any of the foregoing methods, wherein the channel can be sized to accommodate formation of a layer of matrix material during densification of the near net shape fiber preform, the matrix material layer having a height of 10 to 550 microns.

A method according to an exemplary embodiment of this disclosure, among other possible things, includes forming a ceramic matrix composite (CMC) component with an internal cooling channel includes partially densifying first and second fiber preforms to form a portion of a final ceramic matrix volume, machining a first channel into a surface of the partially densified first fiber preform, covering the first channel with a fibrous member to form a near net shape fiber preform with an internal passage formed by the first channel and the fibrous member, and densifying the near net shape fiber preform to form the final ceramic matrix volume.

The method of the preceding paragraph can optionally include, additionally and/or alternatively, any one or more of the following features, configurations, additional components, and/or steps:

A further embodiment of the foregoing method can further include machining a second channel into a surface of the partially densified second fiber preform, joining the partially densified first fiber preform to the partially densified second fiber preform at a preform joint, and covering the second channel with the fibrous member.

A further embodiment of any of the foregoing methods, wherein the fibrous member can be a braided fiber tube and wherein the joined and partially densified first and second fiber preforms can be inserted into the braided fiber tube to cover the first and second channels.

A further embodiment of any of the foregoing methods, wherein the fibrous member can be a fiber ply and wherein the fiber sheet can be wrapped around the partially densified first fiber preform and the partially densified second fiber preform to cover the first and second channels and wherein ends of the fiber ply are joined at an overlap joint.

A further embodiment of any of the foregoing methods can further include machining grooves into the partially densified first fiber preform at the preform joint.

A further embodiment of any of the foregoing methods, wherein the grooves can be sized and arranged to receive fibers of the partially densified second fiber preform.

A further embodiment of any of the foregoing methods, wherein partially densifying the first fiber preform and partially densifying the second fiber preform can include forming a partially densified fiber preform having a total volume fraction of fiber plus ceramic matrix ranging from 50 to 70 percent.

A further embodiment of any of the foregoing methods, wherein an amount of densification provided in partially densifying the first fiber preform and the second fiber preform can be positively correlated with a thickness of the fibrous member covering the first and second channels, with densification increased with thickness.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method for forming a ceramic matrix composite (CMC) component with an internal cooling channel, the method comprising:
   partially densifying a first fiber preform to form a portion of a final ceramic matrix volume;
   machining a first channel into a surface of the partially densified first fiber preform;
   covering the first channel with a fibrous member to form a near net shape fiber preform with an open internal passage formed by the first channel and the fibrous member; and
   densifying the near net shape fiber preform with the open internal passage to form the final ceramic matrix volume.

2. The method of claim 1, wherein the fibrous member comprises a braided fiber tube and wherein covering the first channel with the fibrous member comprises inserting the partially densified first fiber preform into the braided fiber tube.

3. The method of claim 1, wherein the fibrous member comprises a fiber ply and wherein covering the first channel with the fibrous member comprises wrapping the fiber ply around the partially densified first fiber preform and joining ends of the fiber ply at an overlap joint.

4. The method of claim 1, wherein the fibrous member is a partially densified second fiber preform.

5. The method of claim 4, wherein the partially densified second fiber preform has a second channel formed in a surface of the partially densified second fiber preform.

6. The method of claim 5, wherein the first channel opens to the second channel.

7. The method of claim 1, wherein machining the first channel comprises forming heat transfer features on a channel surface, wherein the heat transfer features protrude into the internal cooling channel.

8. The method of claim 1, and further comprising:
   applying an interface coating to the first fiber preform before partially densifying the first fiber preform; and
   applying an interface coating to the fibrous member before densifying the near net shape preform.

9. The method of claim 1, wherein the first fiber preform is a three-dimensional woven fiber preform.

10. The method of claim 1, wherein partially densifying the first fiber preform comprises forming a partially densified fiber preform having a total volume fraction of fiber plus ceramic matrix ranging from 50 to 70 percent.

11. The method of claim 10, wherein an amount of densification provided in partially densifying the first fiber preform is positively correlated with a thickness of the fibrous member covering the first channel, with densification increasing with thickness.

12. The method of claim 10, wherein the first channel is sized to accommodate formation of a layer of matrix material during densification of the near net shape fiber preform, the matrix material layer having a height ranging from 10 to 550 microns.

13. A method for forming a ceramic matrix composite (CMC) component with an internal cooling channel, the method comprising:
    partially densifying a first fiber preform and a second fiber preform to form a portion of a final ceramic matrix volume;
    machining a first channel into a surface of the partially densified first fiber preform;
    covering the first channel with a fibrous member to form a near net shape fiber preform with an open internal passage formed by the first channel and the fibrous member; and
    densifying the near net shape fiber preform with the open internal passage to form the final ceramic matrix volume.

14. The method of claim 13, and further comprising:
    machining a second channel into a surface of the partially densified second fiber preform;
    joining the partially densified first fiber preform to the partially densified second fiber preform at a preform joint; and
    covering the second channel with the fibrous member.

15. The method of claim 14, wherein the fibrous member comprises a braided fiber tube and wherein the joined and partially densified first and second fiber preforms are inserted into the braided fiber tube to cover the first and second channels.

16. The method of claim 14, wherein the fibrous member comprises a fiber ply and wherein the fiber ply is wrapped around the partially densified first fiber preform and the partially densified second fiber preform to cover the first and second channels and wherein ends of the fiber ply are joined at an overlap joint.

17. The method of claim 14, and further comprising machining grooves into the partially densified first fiber preform at the preform joint.

18. The method of claim 17, wherein the grooves are sized and arranged to receive fibers of the partially densified second fiber preform such that fibers nest in the grooves to create a mechanical lock.

19. The method of claim 14, wherein partially densifying the first fiber preform and partially densifying the second fiber preform comprises forming first and second partially densified fiber preforms each having a total volume fraction of fiber plus ceramic matrix ranging from 50 to 70 percent.

20. The method of claim 19, wherein an amount of densification provided in partially densifying the first fiber preform and the second fiber preform is positively correlated with a thickness of the fibrous member covering the first and second channels, with densification increased with thickness.

* * * * *